(12) United States Patent
Kosslyn et al.

(10) Patent No.: US 9,870,567 B2
(45) Date of Patent: Jan. 16, 2018

(54) USER INTERFACE TAILORED BY SUBSCRIPTION STATE FOR A CHANNEL OF A CONTENT SHARING PLATFORM

(71) Applicant: Google Inc., Mountain View, CA (US)

(72) Inventors: David Kosslyn, San Francisco, CA (US); Alexandra Conrads, San Francisco, CA (US); Josh Sassoon, San Francisco, CA (US); Stace Peterson, Sunnyvale, CA (US); Molly C Nix, San Francisco, CA (US)

(73) Assignee: Google Inc., Mountain View, CA (US)

( * ) Notice: Subject to any disclaimer, the term of this patent is extended or adjusted under 35 U.S.C. 154(b) by 336 days.

(21) Appl. No.: 13/754,312

(22) Filed: Jan. 30, 2013

(65) Prior Publication Data

US 2014/0215350 A1 Jul. 31, 2014

(51) Int. Cl.
*G06F 3/00* (2006.01)
*G06Q 30/02* (2012.01)
*G06F 17/30* (2006.01)
*H04N 21/258* (2011.01)
*H04N 21/278* (2011.01)
*H04N 21/472* (2011.01)
(Continued)

(52) U.S. Cl.
CPC ....... *G06Q 30/02* (2013.01); *G06F 17/30035* (2013.01); *G06F 17/30126* (2013.01); *G06F 17/30867* (2013.01); *H04N 21/25866* (2013.01); *H04N 21/278* (2013.01); *H04N 21/472* (2013.01); *G06F 3/0481* (2013.01); *H04N 21/2668* (2013.01)

(58) Field of Classification Search
CPC ............. G06F 9/4443; G06F 17/30867; G06F 17/30876; G06F 3/0481–3/0489

USPC ......................................................... 715/745
See application file for complete search history.

(56) References Cited

U.S. PATENT DOCUMENTS 5,619,249 A * 4/1997 Billock et al. .................... 725/5
6,314,572 B1 * 11/2001 LaRocca et al. ............... 725/60
6,341,316 B1 * 1/2002 Kloba et al. .................. 709/248
(Continued)

FOREIGN PATENT DOCUMENTS

KR 1020090077519 7/2009
KR 1020110093360 8/2011

OTHER PUBLICATIONS

International Search Report and Written Opinion for International Patent Application No. PCT/US2014/011908, dated May 7, 2014, 11 pages.

*Primary Examiner* — Steven B Theriault
(74) *Attorney, Agent, or Firm* — Lowenstein Sandler LLP (57) ABSTRACT

A method for providing a user interface tailored by subscription state for a channel of a content sharing platform is disclosed. The method includes determining a subscription state of a user that is accessing a page of a channel of a content sharing platform. The method further include when the subscription state of the user is a non-subscriber of the channel, providing a non-subscriber user interface on the page of the channel, the non-subscriber user interface comprising a non-subscriber content item. The method also includes when the subscription state of the user is a subscriber of the channel, providing a subscriber user interface on the page of the channel, the subscriber user interface comprising one or more content items from the channel that are tailored to the user and to the channel.

18 Claims, 6 Drawing Sheets

(51) Int. Cl.
  *G06F 3/0481* (2013.01)
  *H04N 21/2668* (2011.01)

(56) References Cited

U.S. PATENT DOCUMENTS

| | | | |
|---|---|---|---|
| 6,959,319 B1* | 10/2005 | Huang et al. | 709/203 |
| 7,185,092 B2* | 2/2007 | Furui et al. | 709/225 |
| 7,412,534 B2* | 8/2008 | Tsang | G06Q 10/00 |
| | | | 709/226 |
| 7,596,797 B1* | 9/2009 | Kapner et al. | 725/46 |
| 7,822,428 B1* | 10/2010 | Morris et al. | 455/508 |
| 8,355,955 B1* | 1/2013 | Mirchandani et al. | 705/26.1 |
| 2002/0010625 A1* | 1/2002 | Smith et al. | 705/14 |
| 2002/0010860 A1* | 1/2002 | Chu | 713/182 |
| 2003/0005133 A1* | 1/2003 | Banerjee | G06Q 10/10 |
| | | | 709/229 |
| 2005/0010635 A1* | 1/2005 | Schwesig et al. | 709/203 |
| 2005/0240963 A1* | 10/2005 | Preisman et al. | 725/44 |
| 2005/0273499 A1* | 12/2005 | Goodman et al. | 709/206 |
| 2006/0123455 A1 | 6/2006 | Pai et al. | |
| 2007/0106803 A1* | 5/2007 | Peterson et al. | 709/229 |
| 2007/0204233 A1* | 8/2007 | Savage | G06F 9/4443 |
| | | | 715/747 |
| 2007/0219910 A1* | 9/2007 | Martinez | 705/51 |
| 2008/0184300 A1* | 7/2008 | Macrae et al. | 725/39 |
| 2009/0013266 A1* | 1/2009 | Gandhi et al. | 715/760 |
| 2009/0116668 A1* | 5/2009 | Davidson | 381/119 |
| 2009/0228938 A1* | 9/2009 | White | H04N 7/17318 |
| | | | 725/87 |
| 2009/0254856 A1* | 10/2009 | Cwajbaum | 715/808 |
| 2009/0322790 A1* | 12/2009 | Behar et al. | 345/659 |
| 2010/0180311 A1* | 7/2010 | Gordon | G06Q 30/0251 |
| | | | 725/61 |
| 2011/0191796 A1* | 8/2011 | Padala et al. | 725/25 |
| 2011/0214170 A1* | 9/2011 | Wu | 726/7 |
| 2011/0231489 A1* | 9/2011 | Rathod | 709/204 |
| 2011/0264530 A1* | 10/2011 | Santangelo et al. | 705/14.64 |
| 2011/0321072 A1* | 12/2011 | Patterson | H04N 21/44222 |
| | | | 725/5 |
| 2012/0011536 A1 | 1/2012 | Wang et al. | |
| 2013/0247105 A1* | 9/2013 | Jovanovski et al. | 725/46 |
| 2013/0262558 A1* | 10/2013 | Wood et al. | 709/203 |
| 2014/0130182 A1* | 5/2014 | Yackanich | G06F 21/60 |
| | | | 726/27 |
| 2014/0250465 A1* | 9/2014 | Mulholland et al. | 725/60 |

* cited by examiner

USER INTERFACE TAILORED BY SUBSCRIPTION STATE FOR A CHANNEL OF A CONTENT SHARING PLATFORM

TECHNICAL FIELD

This disclosure relates to the field of multimedia content and, in particular, to a user interface tailored by subscription state for a channel of a content sharing platform.

BACKGROUND

On the Internet, content sharing platforms allow users to upload, view, and share content, such as video content, image content, audio content, and so on. This shared content may include content from professional content creators, e.g., movie clips, TV clips, and music videos, as well as content from amateur content creators, e.g., video blogging and short original videos. In some cases, the shared content is provided as streaming media. Streaming media is multimedia, such as video and audio content, which is received by and presented to an end-user while being delivered by a streaming provider.

Content sharing platforms may provide centralized locations for a content owner to showcase their content. These centralized locations are sometimes known as a channel. The channel may be presented by the content sharing platform via one or more channel pages. The channel may be used by a content owner to convince new viewers to subscribe to the channel. Furthermore, a channel may be used by a content owner as a central location for subscribed viewers to comment on content, find the latest updates, and discover new content from the channel owner.

Currently, a content owner of a channel may try to craft a presentation of a page of the channel to address these two disparate audiences (i.e., newcomer non-subscribed viewer and dedicated subscribed viewers). However, a problem arises because the content owner of the channel may have just one set of tools to showcase content to two different audiences. As a result, one of the audiences is generally viewing content on the page of the channel that is not relevant to them.

There are a number of pieces of technology that exist around serving and selecting content to users. One technology is access control lists (ACLs), where a publisher can dictate the specific users or groups of users that can see (or edit) some particular pieces of content. Another technology is ranking technology, which allows users to see all content that they choose, but to highlight certain pieces of the content based, for example, on what pages they have visited within the content platform, what they have liked previously, and demographic information. However, neither of these technologies directs a specific section of content of a platform at a general group of users. Rather, these technologies either target a specific user and/or are based on a specific user-provided ranking.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In one implementation, a method for providing a user interface tailored by subscription state for a channel of a content sharing platform is disclosed. The method includes determining a subscription state of a user that is accessing a page of a channel of a content sharing platform. The method further include when the subscription state of the user is a non-subscriber of the channel, providing a non-subscriber user interface on the page of the channel, the non-subscriber user interface comprising a video introducing the channel to the user. The method also includes when the subscription state of the user is a subscriber of the channel, providing a subscriber user interface on the page of the channel, the subscriber user interface comprising one or more content items from the channel that are tailored to the user and to the channel.

In one implementation, the non-subscriber user interface and the subscriber user interface comprise a portion of the page and are located at a top section of the page of the channel. Furthermore, the subscription state may be determined based on login credentials of the user. In addition, the one or more content items from the channel are tailored to the user based on a viewing history of the user in the content sharing platform. In one implementation, the page of the channel may be a document rendered in HyperText Markup Language (HTML). In one implementation, the non-subscriber content item may include a video describing the channel.

The method may further include accessing a history of user navigation in the content sharing platform, the history of user navigation comprising a number of times the user previously visited pages of channels of the content sharing platform and a number of times the user views each content item of the content sharing platform. In another implementation, when the subscription state of the user is the subscriber of the channel and when a number of times the user previously visited the channel is less then a predetermined visit threshold, providing the non-subscriber user interface on the channel page. Furthermore, when the subscription state of the user is the non-subscriber of the channel and when the user has viewed a content item associated with the channel greater than a predetermined viewing threshold, the method may include providing the subscriber user interface on the channel page.

In additional implementations, computing devices for performing the operations of the above described implementations are also disclosed. Additionally, in implementations of the disclosure, a computer readable storage media stores methods for performing the operations of the above described implementations.

BRIEF DESCRIPTION OF THE DRAWINGS

The present disclosure is illustrated by way of example, and not by way of limitation, in the figures of the accompanying drawings.

DETAILED DESCRIPTION

Implementations are described for a user interface tailored by subscription state for a channel of a content sharing platform. In one implementation, a user interface is provided on a page of the channel, where the user interface is tailored to a subscription state of a user accessing the page of the channel. A channel can be data content available from a common source or data content having a common topic or theme. The data content can be digital content chosen by a user, digital content made available by a user, digital content uploaded by a user, digital content chosen by a content provider, digital content chosen by a broadcaster, etc. For example, a channel X can include videos Y and Z. A channel can be associated with an owner, who is a user that can perform actions on the channel. Different activities can be associated with the channel based on the owner's actions, such as the owner making digital content available on the channel, the owner selecting (e.g., liking) digital content associated with another channel, the owner commenting on digital content associated with another channel, etc. The activities associated with the channel can be collected into an activity feed for the channel. Users, other than owner of the channel, can subscribe to one or more channels in which they are interested. Once a user subscribes to a channel, the user can be presented with information from the channel's activity feed. If a user subscribes to multiple channels, the activity feed for each channel to which the user is subscribed can be combined into a syndicated activity feed. Information from the syndicated activity feed can be presented to the user.

In one implementation, when the user is determined to be not subscribed to the channel, the user interface presents a welcome video (or some other piece of welcome content) introducing the channel and content provided by the channel. In another implementation, when the user is determined to be a subscriber to the channel, the user interface presents a welcome back section including content from the channel that is tailored to the user. In some implementations, additional factors may also contribute to which version of the user interface (subscriber version or non-subscriber version) is shown to the viewing user.

In one implementation, a method for providing a user interface tailored by subscription state for a channel of a content sharing platform is disclosed. The method includes determining a subscription state of a user that is accessing a page of a channel of a content sharing platform. The method further includes when the subscription state of the user is a non-subscriber of the channel, providing a non-subscriber user interface on the page of the channel, the non-subscriber user interface comprising a non-subscriber content item. The method also includes when the subscription state of the user is a subscriber of the channel, providing a subscriber user interface on the page of the channel, the subscriber user interface comprising one or more content items from the channel that are tailored to the user and to the channel.

Implementations of the disclosure have a different layer of granularity than previous solutions for serving and selecting content tailored to users of a platform. Previously, a content sharing platform either manually-specified specific people to share content with, or an algorithm automatically determined the content on a per-user basis. Implementations of the disclosure take an approach between the previous solutions by providing two different content presentation states, and determining which state to present based on a user action (e.g., subscription state of the user). The benefit of this approach is that a channel owner can provide tailored content to first time or novice visitors, in order to interest these users in the channel, and at the same time, the channel owner can also offer per-user granularity and updates to subscribed users of the channel.

Figure 1:
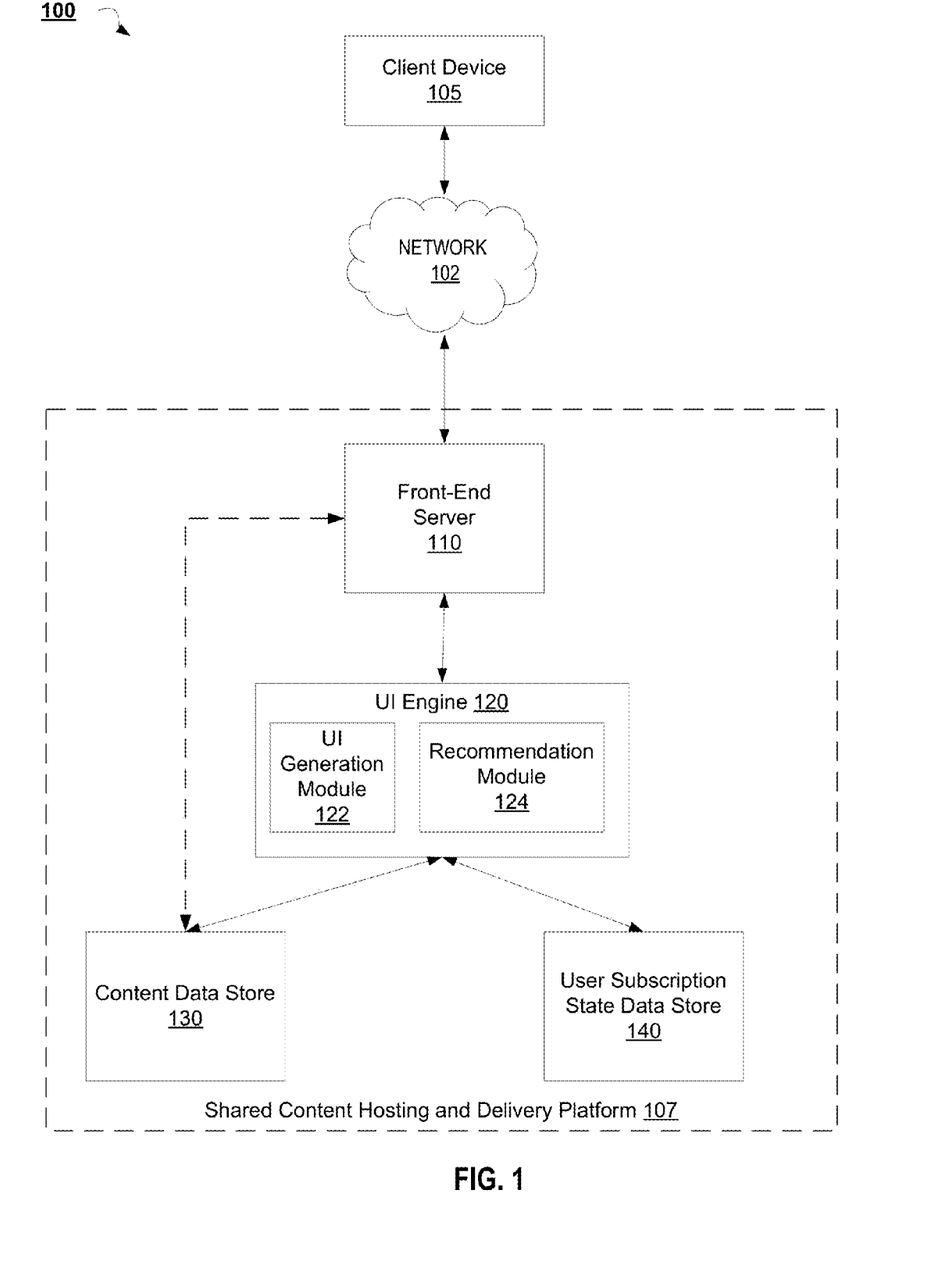
FIG. 1 is a block diagram illustrating an exemplary network architecture in which implementations of the disclosure may be implemented.

FIG. 1 is a block diagram illustrating an exemplary network architecture 100 in which implementations of the disclosure may be implemented. The network architecture 100 includes a client device 105 communicably coupled to a shared content hosting and delivery platform 107 via a network 102. In some implementations, content hosting and delivery platform 107 is also known as a content sharing platform. The network 102 includes the Internet in one implementation. In other implementations, other networks, wired and wireless, such as an intranet, local area network (LAN), wide area network (WAN), or broadcast network may be used as or be part of network 102.

As illustrated, shared content hosting and delivery platform 107 includes front-end server 110, a user interface (UI) engine 120, a content data store 130, and a user subscription state data store 140. A data store may include, but is not limited to, a table, a database, a directory, a repository, and one or more files, to name a few examples. One or more client devices 105 may be in communication with the front-end server 110 over the network 102.

The client device 105 may be any type of computing device, for example, a device including a processor, a computer-readable medium, and a memory. The client device 105 may be, for example, a personal computer, a laptop computer, a tablet computer, a personal digital assistant (PDA), a cellular telephone, other mobile devices, etc. In some implementations, the client device 105 may be executing a browser application or other application adapted to communicate over Internet related protocols (e.g., TCP/IP and HTTP) and/or display a user interface. While only a single client device 105 is shown in FIG. 1, network architecture 100 may support a large number of concurrent sessions with many client devices 105.

Shared content hosting and delivery platform 107 is capable of operating within a single server device or on multiple server devices. For example, although each of front-end server 110, UI engine 120, content data store 130, and user subscription state data store 140 are depicted in FIG. 1 as single, disparate components, these components may be implemented together in a single device or networked in various combinations of multiple different devices that operate together. Examples of devices may include, but are not limited to, servers, mainframe computers, networked computers, process-based devices, and similar type of systems and devices.

During operation of network architecture 100, a user may access shared content hosting and delivery platform 107 via client device 105 over network 102. The front-end server 110 receives communications from the client device 105, and processes and/or directs these communications accordingly. In one implementation, the front-end server 110 comprises a processing device and a computer-readable memory.

Front-end server 110 is communicably coupled to UI engine 120, which may reside on the same machine as front-end server 110 or a different machine. UI engine 120 may be implemented in hardware, software, firmware, or any combination of the above. In implementations of the disclosure, UI engine 120 provides a user interface tailored to a subscription state of the user, the user interface provided for a channel of a content sharing platform. In one implementation, the subscription state of a user is either subscribed to the channel or not subscribed (also referred to as non-subscribed, unsubscribed, etc.) to the channel. In one implementation, UI engine 120 includes a UI generation module 122 and a recommendation module 124.

As discussed above, a channel can be data content available from a common source or data content having a common topic or theme. The data content can be digital content chosen by a user, digital content made available by a user, digital content uploaded by a user, digital content chosen by a content provider, digital content chosen by a broadcaster, etc. For example, a channel X can include videos Y and Z. A channel can be associated with an owner, who is a user that can perform actions on the channel. Different activities can be associated with the channel based on the owner's actions, such as the owner making digital content available on the channel, the owner selecting (e.g., liking) digital content associated with another channel, the owner commenting on digital content associated with another channel, etc. The activities associated with the channel can be collected into an activity feed for the channel. Users, other than owner of the channel, can subscribe to one or more channels in which they are interested. Once a user subscribes to a channel, the user can be presented with information from the channel's activity feed. If a user subscribes to multiple channels, the activity feed for each channel to which the user is subscribed can be combined into a syndicated activity feed. Information from the syndicated activity feed can be presented to the user.

In one implementation, UI generation module 122 generates a user interface for each channel page of the shared content hosting and delivery platform 107, where the user interface is based on a subscription state of the user accessing the channel page. A channel page is a document, or set of documents, (e.g., rendered in HyperText Markup Language (HTML)) provided by the shared content hosting and delivery platform 107 that may be used by a content owner to showcase content items owned by the content owner. The channel page may be used by the content owner to convince new viewers to subscribe to the channel, as well as to provide a central location for subscribed viewers to comment on a content owner's content, find the latest updates, and discover new content from the content owner.

In one implementation, content of the user interface for the channel page is based on a subscription state of the accessing user. More specifically, the UI generation module 122 may generate one version (i.e., a non-subscribed user interface) of the user interface for a non-subscriber user of the channel page, and may generate another version (i.e., a subscribed user interface) of the user interface for a subscribed user of the channel page. In one implementation, the non-subscribed user interface may include a non-subscriber content item that is intended to welcome a user to the channel. For example, the non-subscriber content item may include a "welcome video" or trailer for the channel, explaining what the channel is all about. The subscribed user interface may present a "welcome back" section, featuring latest updates from the channel and one or more videos from the channel recommended to the user.

When a user accesses a channel page of the shared content hosting and delivery platform 107, the UI generation module 122 first determines a subscription state of the user. In one implementation, the UI generation module 122 may reference login credentials of the user with subscription data stored in the user subscription state data store 140. The user subscription state data store 140 may maintain listing or data structures identifying the particular channel subscriptions of each user of the shared content hosting and delivery platform 107.

Based on the particular subscription state of the user, the UI generation module 122 may generate the user interface tailored to the subscription state. If the user is determined to be not subscribed to the channel, then the non-subscriber user interface with the non-subscriber content, such as a welcome video, may be generated and presented. If the user is determined to be subscribed to the channel, then the UI generation module 122 may work in conjunction with the recommendation module 124 to generate the subscriber user interface with a welcome back section. In one implementation, the recommendation module 124 may access a viewing history of the user to generate one or more content items from the content owner of the channel that are relevant to the user.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

In some implementations, the determination of which user interface version (subscriber or non-subscriber) to present on the channel page is based on more than the subscribed state of the user. For example, if a user is not subscribed to the channel but has viewed content of the content owner of the channel more than a predetermined number of times, then the user may be shown the subscriber user interface for subscribers with the "welcome back" content even though they are not subscribed to the channel. Similarly, if a user is a subscriber of the channel but has visited in the channel less than a predetermined number of times in a predetermined time period, then the subscribed user may be shown the non-subscriber user interface for the non-subscribers with the non-subscriber content item (e.g., a welcome video).

In one implementation, an administrator of the shared content hosting and delivery platform 107 may configure the settings for when a user is shown the subscriber or non-subscriber user interface. In another implementation, the owner of the channel may configure the settings for when a user is shown the subscriber or the non-subscriber user interface. In some implementations, the user viewing the channel page may select which user interface version (subscriber or non-subscriber) they prefer to view.

In one implementation, the channel owner creates a non-subscriber content item, such as the welcome video, and selects it for presentation in the non-subscriber user interface. In some implementations, a content item other than a video, such as audio or text, may be shown in the non-subscriber user interface. The non-subscriber content item may be stored in content data store 130 and identified by the channel owner to be used as the welcome content item in the non-subscriber user interface. For example, configuration settings for the page of the channel may include a section for identifying the particular non-subscriber content item to be used in the non-subscriber user interface.

In one implementation, the user interface may reside in a top section of the channel page. For example, the user interface may reside beneath a header image presenting a logo of the channel, in order to immediately catch the view of the user accessing the channel page. Content that is directly controlled by the content owner of the channel page may then be presented below the user interface.

Figure 2:
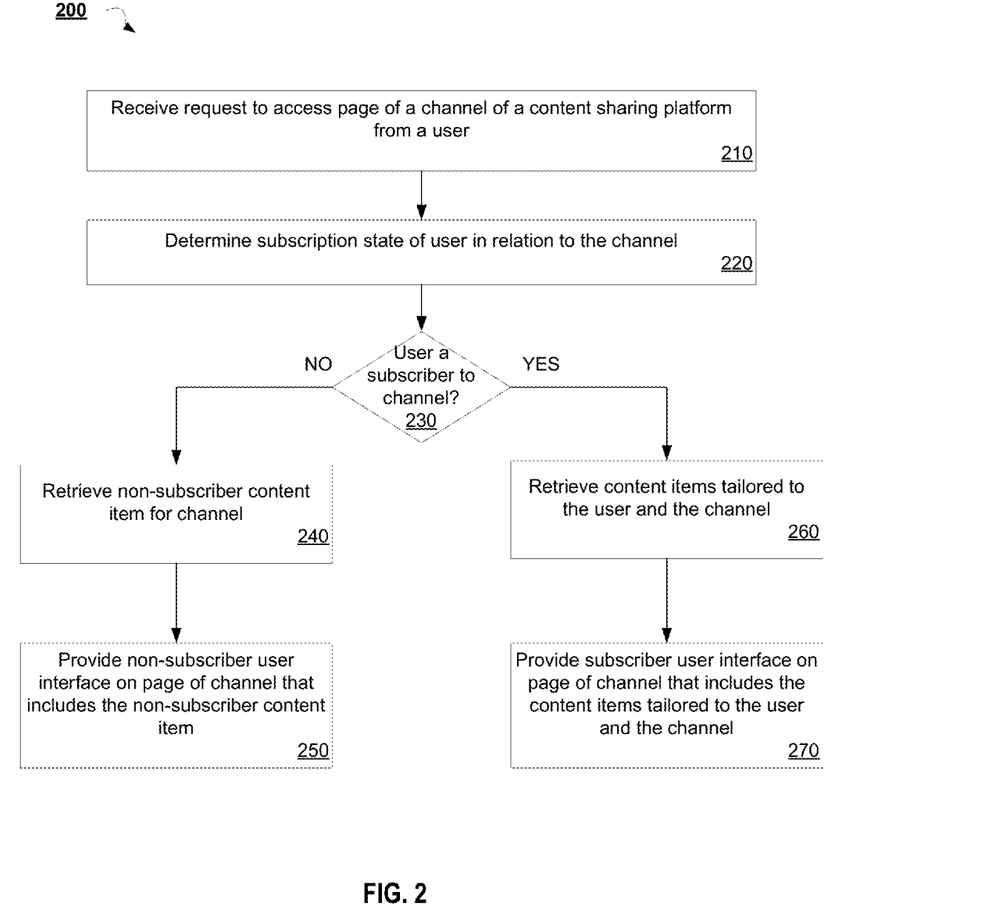
FIG. 2 is a flow diagram illustrating a method for providing a user interface tailored by subscription state for a channel of a content sharing platform, according to some implementations of the disclosure.

FIG. 2 is a flow diagram illustrating a method 200 for providing a user interface tailored by subscription state for a channel of a content sharing platform, according to some implementations of the disclosure. The method 200 may be performed by processing logic that comprises hardware (e.g., circuitry, dedicated logic, programmable logic, microcode, etc.), software (e.g., instructions run on a processing device to perform hardware simulation), or a combination thereof.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 200 may be performed by UI engine 120 of shared content hosting and delivery platform 107, as shown in FIG. 1.

Referring to FIG. 2, at block 210, method 200 begins when a request is received to access a page of a channel of a content sharing platform. The request is received from a user of the content sharing platform that is accessing the page. A channel page may include a document, or set of documents, (e.g., rendered in HTML) provided by the content sharing platform to showcase content items owned by a content owner of the channel. The channel page may be used by the content owner to convince new viewers to subscribe to the channel, as well as to provide a central location for subscribed viewers to comment on a content owner's content, find the latest updates, and discover new content from the content owner.

At block 220, a subscription state of the user accessing the channel page is determined in relation to the channel. In one embodiment, login credentials of the user may be cross-referenced against a subscription state data store to determine the subscription state of the user with respect to the channel. Then, at decision block 230, it is determined whether the user is subscribed to the channel based on the determination made at block 220.

If the user is not subscribed at decision block 230, the method 200 proceeds to block 240 where content for non-subscribed users (e.g., a welcome video for the channel) is retrieved. In one implementation, a channel owner generates the non-subscriber content item and marks it for use as the welcome content item in configuration settings for the channel page. The non-subscriber content item may be retrieved from a content data store of the content sharing platform. In one implementation, the non-subscriber content item provides introductory information about the channel and content provided by the channel. At block 250, a user interface is provided on the channel page that includes the content for non-subscribed users (e.g. the welcome video). In one implementation, the user interface is provided in a top section of the page in order to increase the likelihood that is one of the first items viewed on the page by the user.

If, at decision block 230, the user is a subscriber to the channel, then method 200 proceeds to block 260 where one or more content items tailored to the user and to the channel are retrieved. In one implementation, a viewing history of the user is referenced for use in selecting the content items originating from the content owner of the channel that are relevant to the user. Then, at block 270, a user interface is provided on the channel page that includes the retrieved content items tailored to the user and the channel page. In one implementation, the user interface is provided in a top section of the page in order to increase the likelihood that is one of the first items viewed on the page by the user.

Figure 3:
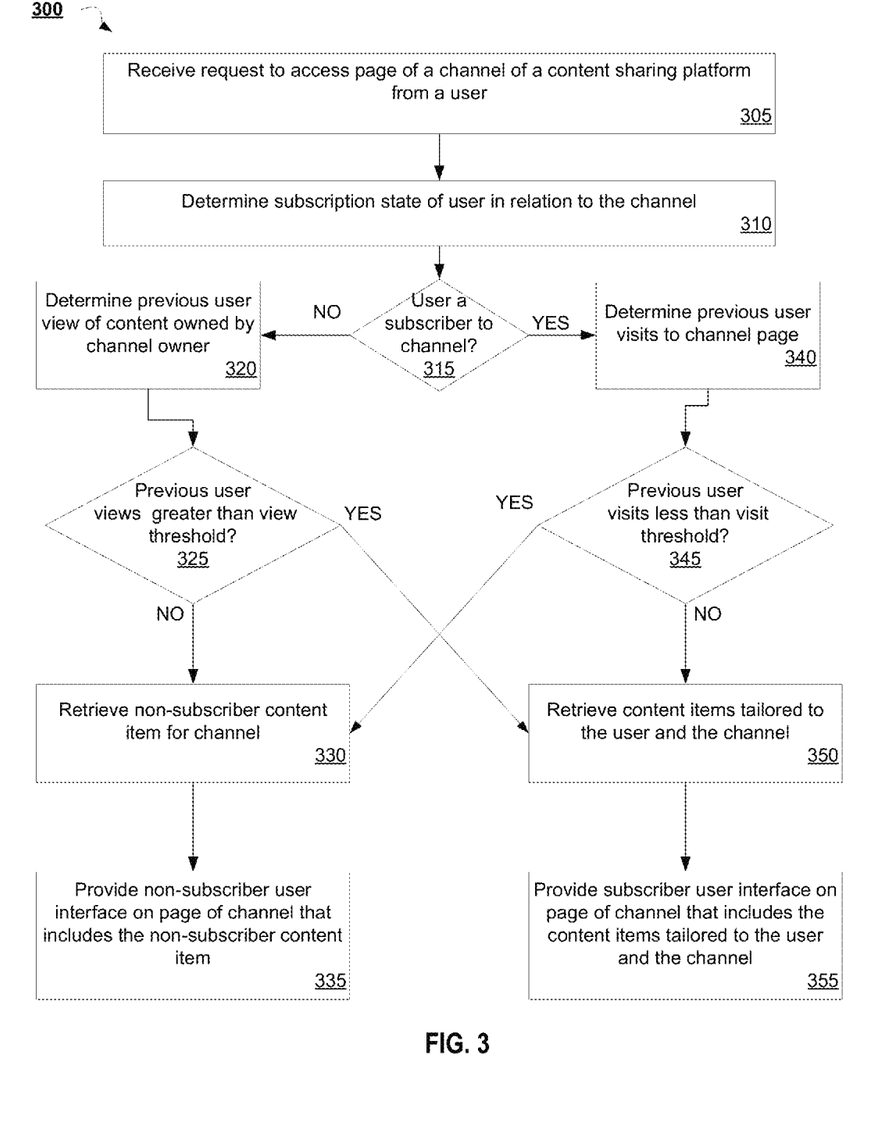
FIG. 3 is a flow diagram illustrating a method for providing a user interface tailored by subscription state and additional user viewing statistics, where the user interface is presented on a channel of a content sharing platform, according to an implementation of the disclosure.

FIG. 3 is a flow diagram illustrating a method 300 for providing a user interface tailored by subscription state and additional user viewing statistics, where the user interface is presented on a channel of a content sharing platform, according to an implementation of the disclosure. The method 300 may be performed by processing logic that comprises hardware (e.g., circuitry, dedicated logic, programmable logic, microcode, etc.), software (e.g., instructions run on a processing device to perform hardware simulation), or a combination thereof. In one implementation, method 300 may be performed by UI engine 120 of a shared content hosting and delivery platform 107, as shown in FIG. 1.

Referring to FIG. 3, blocks 305 through 315 are the same as blocks 210-230 described with respect to FIG. 2, and a similar description is applicable to FIG. 3. At decision block 315, if the user is not subscribed, then method 300 proceeds to block 320 where a previous number of user views of content owned by the channel owner is determined. In one implementation, content sharing platform may maintain a data store of statistics from which this information may be gathered. Then, at decision block 325, it is determined whether the number of previous user views of channel content is greater than a view threshold.

If not, method 300 proceeds to block 330 where a non-subscriber content item, such as a welcome video, for the channel is retrieved. In one implementation, a channel owner generates the non-subscriber content item and marks it for use as the welcome content in configuration settings for the channel page. The non-subscriber content item may be retrieved from a content data store of the content sharing platform. In one implementation, the non-subscriber content item provides introductory information about the channel and content provided by the channel. At block 335, a non-subscriber user interface is provided on the channel page that includes the non-subscriber content item. In one implementation, the non-subscriber user interface is provided in a top section of the page in order to increase the likelihood that is one of the first items viewed on the page by the user.

If, at decision block 325, the number of previous user views is greater than the view threshold, then method 300 proceeds to block 350, which is described in greater detail below.

Returning back to decision block 315, if the user is determined to be a subscriber to the channel, then method 300 proceeds to block 340 where a number of previous user visits to the channel page is determined. In one implementation, the number of visits is identified over a predetermined time interval. Then, at decision block 345, it is determined whether the number of previous user visits over the time interval is less than a visit threshold.

If not, the method 300 proceeds to block 350 where one or more content items tailored to the user and to the channel are retrieved. In one implementation, a viewing history of the user is referenced to generate the content items originating from the content owner of the channel that are relevant to the user. Then, at block 355, a subscriber user interface is provided on the channel page that includes the retrieved content items tailored to the user and the channel page. In one implementation, the subscriber user interface is provided in a top section of the page in order to increase the likelihood that it is one of the first items viewed on the page by the user.

On the other hand, if, at decision block 345, the number of previous user visits over the time interval is greater than or equal to the visit threshold, then method 300 proceeds to blocks 330 and 335 to provide the subscribed user a non-subscriber user interface including the non-subscriber content item for the channel.

Note that blocks 350 and 355 are also iterated through when a non-subscribed user visits the page and has viewed content of the channel owner greater than the view threshold at decision block 325. In this case, a non-subscribed user is presented the subscriber user interface of blocks 350 and 355.

Figure 4A:
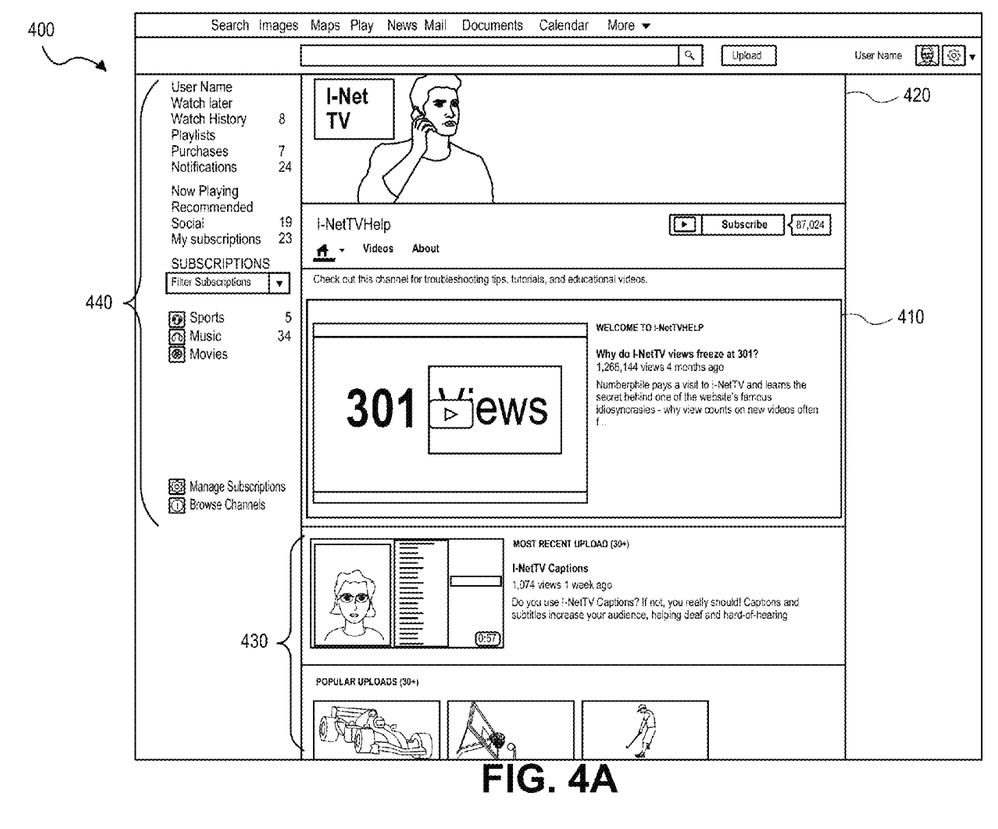
FIGS. 4A and 4B are block diagrams illustrating example user interfaces (UIs) providing a user interface tailored by subscription state for a channel of a content sharing platform according to some implementations.
Figure 4B:
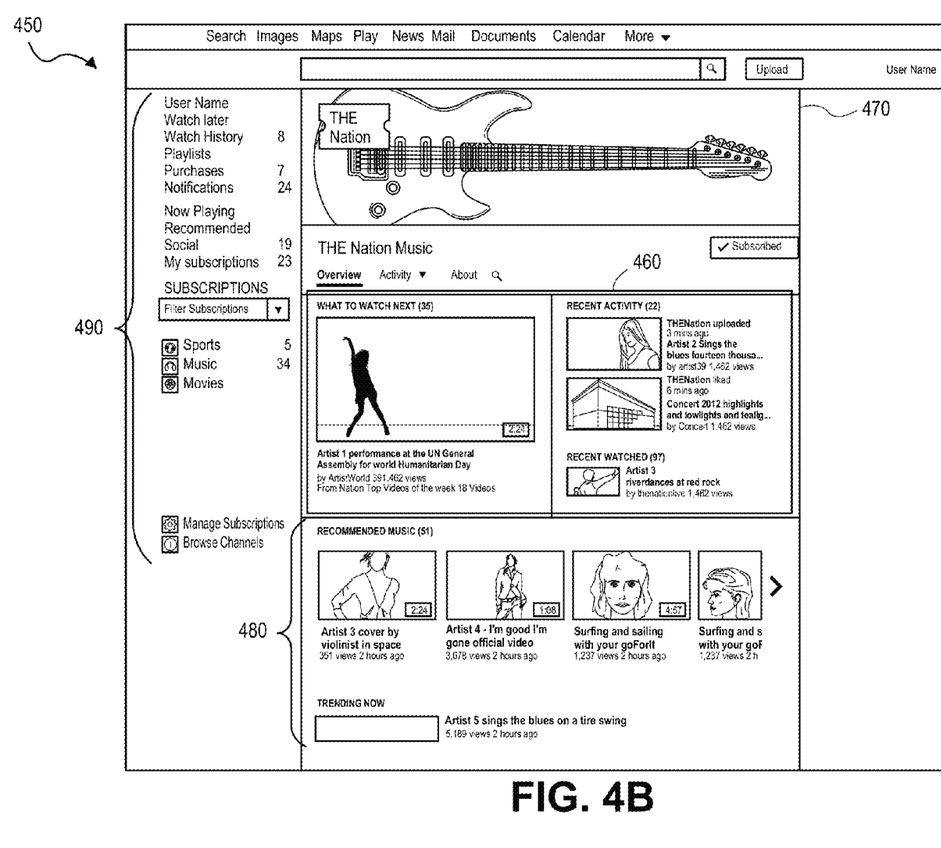

FIGS. 4A and 4B illustrate example screenshots of a channel page UI 400, 450 providing a user interface tailored by subscription state for a channel of a content sharing platform according to implementations of the disclosure. FIG. 4A illustrates an example screenshot of a channel page UI 400 provided to a user viewing a channel page of a content sharing platform. In one implementation, channel page UI 400 provides a non-subscriber user interface 410 for a non-subscriber of the channel. The non-subscriber user interface 410 includes a welcome video (i.e., non-subscriber content item) that introduces the channel and the content provided by the channel. As illustrated, the non-subscriber user interface 410 is located in a top section of the page. The channel page UI 400 also includes items, such as a header 420 and page content 430, that are controlled by the owner of the channel page. Column 440 may be a menu that provides navigation and shortcuts for the overall content sharing platform and is not specific to the channel page UI 400.

FIG. 4B illustrates an example screenshot of a channel page UI 450 provided to a user viewing a channel page of a content sharing platform according to implementations of the disclosure. Channel page UI 450 provides a subscriber user interface 460 for a subscriber of the channel. The subscriber user interface 460 includes content items from the channel that are tailored to the user. As illustrated, the subscriber user interface 460 is located in a top section of the page. In addition, the channel page UI 450 includes items, such as a header 470 and page content 480, that are controlled by the owner of the channel page. Column 490 may be a menu that provides navigation and shortcuts for the overall content sharing platform and is not specific to the channel page UI 450.

Figure 5:
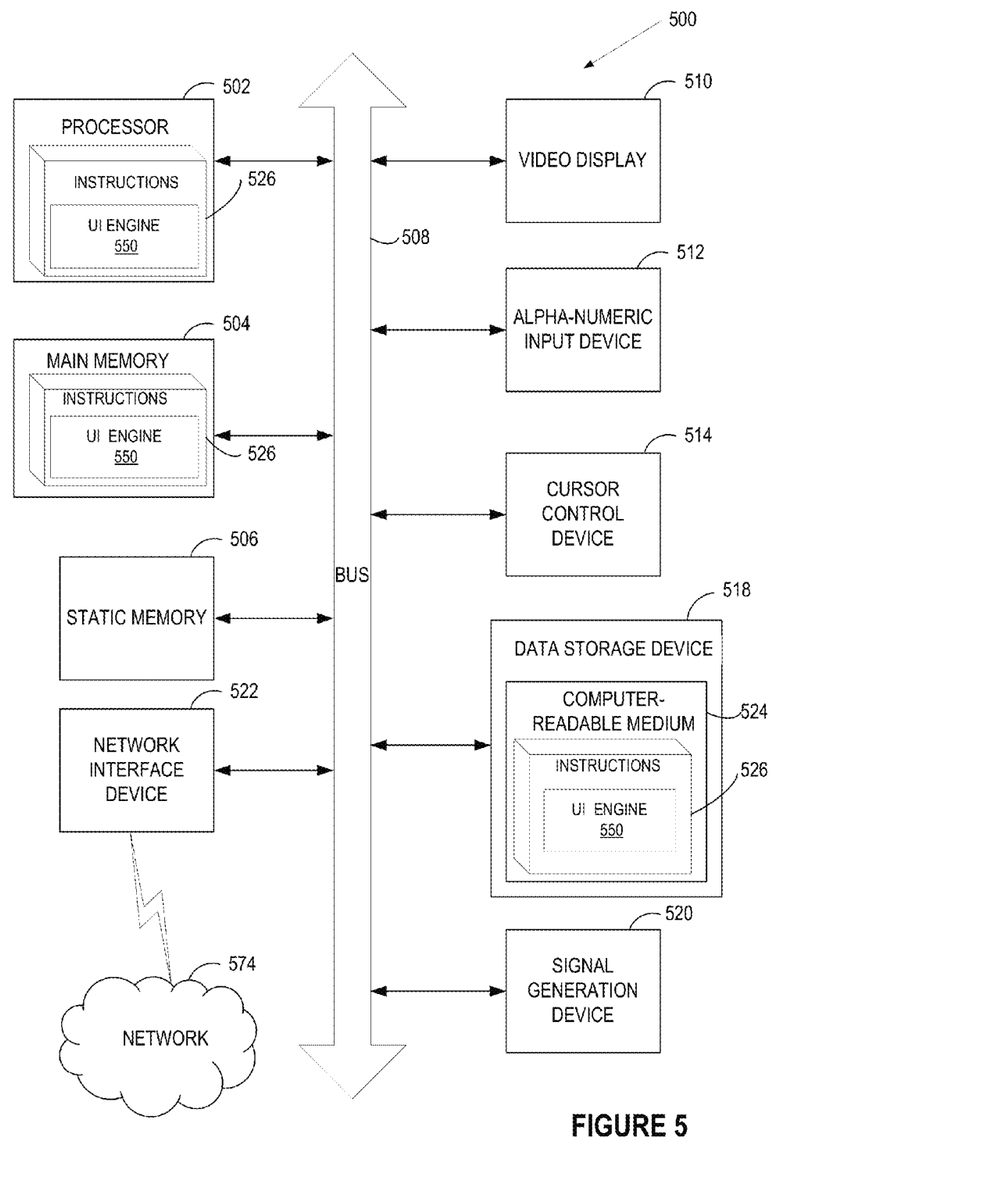
FIG. 5 is a block diagram illustrating an exemplary computer system, according to some implementations.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device (processor) 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 508.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 502 may also be one or more special-purpose processing devices such as an application specific integrated circuit (ASIC), a field programmable gate array (FPGA), a digital signal processor (DSP), network processor, or the like. The processor 502 is configured to execute instructions 526 for performing the operations and steps discussed herein.

The computer system 500 may further include a network interface device 522. The computer system 500 also may include a video display unit 510 (e.g., a liquid crystal display (LCD), a cathode ray tube (CRT), or a touch screen), an alphanumeric input device 512 (e.g., a keyboard), a cursor control device 514 (e.g., a mouse), and a signal generation device 520 (e.g., a speaker).

The data storage device 518 may include a computer-readable storage medium 524 on which is stored one or more sets of instructions 526 (e.g., software) embodying any one or more of the methodologies or functions described herein. The instructions 526 may also reside, completely or at least partially, within the main memory 504 and/or within the processor 502 during execution thereof by the computer system 500, the main memory 504 and the processor 502 also constituting computer-readable storage media. The instructions 526 may further be transmitted or received over a network 574 via the network interface device 522.

In one embodiment, the instructions 526 include instructions for a UI engine 550, which may correspond to UI engine 120 of FIG. 1, and/or a software library containing methods that call a UI engine for providing a user interface tailored by subscription state for a channel of a content sharing platform. While the computer-readable storage medium 524 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "segmenting", "analyzing", "determining", "enabling", "identifying," "modifying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
   determining, by a processing device, a subscription state of a user that is accessing a channel graphical user interface (GUI) dedicated to a channel of a computer network based content sharing platform, wherein the channel was created by the computer network based content sharing platform responsive to a request of a channel curator, the channel presented to the user as the channel GUI and comprising at least one of content items uploaded to the computer network based content sharing platform from a common source or content items uploaded to the computer network based content sharing platform having a common topic or theme;
   responsive to determining that the subscription state of the user is a non-subscriber of the channel, modifying an object of the channel GUI to comprise non-subscriber data uploaded to the channel, the non-subscriber data comprising a non-subscriber content item to introduce the user to the channel, wherein the object comprises a portion of the channel GUI that is separate from other portions of the channel GUI, the other portions populated with content items associated with the channel that are determined without consideration of the subscription state of the user;
   accessing a history of user navigation in the computer network based content sharing platform, the history of user navigation comprising a number of times the user previously visited channel GUIs of channels of the computer network based content sharing platform and a number of times the user views a content item of the computer network based content sharing platform;

responsive to determining that the subscription state of the user is a subscriber of the channel and responsive to a number of times the user previously visited the channel satisfying a predetermined visit threshold condition specified by the computer network based content sharing platform, modifying the object of the channel GUI to comprise subscriber data uploaded to the channel, the subscriber data comprising content items uploaded to the channel subsequent to a previous visit of the user to the channel and comprising one or more content items from the channel that are tailored to the user and to the channel, wherein the number of times the user previously visited the channel is identified from the history of user navigation;

responsive to determining that the subscription state of the user is the subscriber of the channel and responsive to the number of times the user previously visited the channel not satisfying the predetermined visit threshold condition, modifying the object of the channel GUI to comprise the non-subscriber data uploaded to the channel; and providing, in the channel GUI, a user-selectable option to update the subscription state used to modify the object of the channel GUI.

2. The method of claim 1, wherein the portion of the channel GUI is located at a top section of the channel GUI.

3. The method of claim 1, wherein the subscription state is determined based on login credentials of the user.

4. The method of claim 1, wherein the one or more content items from the channel are tailored to the user and to the channel based on a viewing history of the user in the computer network based content sharing platform.

5. The method of claim 1, wherein when the subscription state of the user is the non-subscriber of the channel and when the user has viewed a content item associated with the channel greater than a predetermined viewing threshold, providing the subscriber user interface on the object of the channel GUI.

6. The method of claim 1, wherein the channel GUI of the channel is a document rendered in HyperText Markup Language (HTML).

7. The method of claim 1, wherein the non-subscriber content item comprises a video describing the channel.

8. A non-transitory machine-readable storage medium storing instructions which, when executed, cause a processing device to perform operations comprising:

referencing, by the processing device, a subscription state data store with the retrieved credentials of a user accessing a channel graphical user interface (GUI) dedicated to a channel of a computer network based content sharing platform responsive to a request of a channel curator, the channel presented to the user as the channel GUI and comprising at least one of content items uploaded to the computer network based content sharing platform from a common source or content items uploaded to the computer network based content sharing platform having a common topic or theme;

determining, based on the referencing, a subscription state of the user with respect to the channel;

accessing a history of user navigation in the computer network based content sharing platform, the history of user navigation comprising a number of times the user previously visited channel GUIs of channels of the computer network based content sharing platform and a number of times the user views a content item of the computer network based content sharing platform;

responsive to determining that the subscription state of the user is a non-subscriber of the channel and responsive to a number of times the user previously visited the channel satisfying a predetermined visit threshold condition specified by the computer network based content sharing platform, modifying an object of the channel GUI to comprise non-subscriber data uploaded to the channel, the non-subscriber data comprising a non-subscriber content item to introduce the user to the channel, wherein the object comprises a portion of the channel GUI that is separate from other portions of the channel GUI, the other portions populated with content items associated with the channel that are determined without consideration of the subscription state of the user, wherein the number of times the user previously visited the channel is identified from the history of user navigation;

responsive to determining that the subscription state of the user is a subscriber of the channel, modifying the object of the channel GUI to comprise subscriber data uploaded to the channel, the subscriber data comprising content items uploaded to the channel subsequent to a previous visit of the user to the channel and comprising one or more content items from the channel that are tailored to the user and to the channel;

responsive to determining that the subscription state of the user is the subscriber of the channel and responsive to the number of times the user previously visited the channel satisfying the predetermined visit threshold condition, modifying the object of the channel GUI to comprise the non-subscriber data uploaded to the channel; and providing, in the channel GUI, a user-selectable option to update the subscription state used to modify the object of the channel GUI.

9. The non-transitory machine-readable storage medium of claim 8, wherein the portion of the channel GUI is located at a top section of the channel GUI.

10. The non-transitory machine-readable storage medium of claim 8, wherein the one or more content items from the channel are tailored to the user and to the channel based on a viewing history of the user in the computer network based content sharing platform.

11. The non-transitory machine-readable storage medium of claim 8, wherein when the subscription state of the user is the non-subscriber of the channel and when the user has viewed a content item associated with the channel greater than a predetermined viewing threshold, providing the subscriber user interface on the object of the channel GUI.

12. The non-transitory machine-readable storage medium of claim 8, wherein the channel GUI of the channel is a document rendered in HyperText Markup Language (HTML).

13. The non-transitory machine-readable storage medium of claim 8, wherein the non-subscriber content item comprises a video describing the channel.

14. A system comprising:
a processing device;
a memory coupled to the processing device, the memory to store a plurality of content items; and
a user interface (UI) engine executable by the processing device from the memory, the UI engine to:

determine a subscription state of a user that is accessing a channel graphical user interface (GUI) dedicated to a channel of a computer network based content sharing platform, wherein the channel was created by the computer network based content sharing platform responsive to a request of a channel curator, the channel presented to the user as the channel GUI and comprising at least one of content items uploaded to the computer network based content sharing platform from a common source or content items uploaded to the computer network based content sharing platform having a common topic or theme;

access a history of user navigation in the computer network based content sharing platform, the history of user navigation comprising a number of times the user previously visited channel GUIs of channels of the computer network based content sharing platform and a number of times the user views a content item of the computer network based content sharing platform;

responsive to determining that the subscription state of the user is a non-subscriber of the channel and responsive to a number of times the user previously visited the channel satisfying a predetermined visit threshold condition specified by the computer network based content sharing platform, modify an object of the channel GUI to comprise non-subscriber data uploaded to the channel, the non-subscriber data comprising a non-subscriber content item to introduce the user to the channel, wherein the object comprises a portion of the channel GUI that is separate from other portions of the channel GUI, the other portions populated with content items associated with the channel that are determined without consideration of the subscription state of the user, wherein the number of times the user previously visited the channel is identified from the history of user navigation;

responsive to determining that the subscription state of the user is a subscriber of the channel, modify the object of the channel GUI to comprise subscriber data uploaded to the channel, the subscriber data comprising content items uploaded to the channel subsequent to a previous visit of the user to the channel and comprising one or more content items from the channel that are tailored to the user and to the channel;

responsive to determining that the subscription state of the user is the subscriber of the channel and responsive to the number of times the user previously visited the channel satisfying the predetermined visit threshold condition, modify the object of the channel GUI to comprise the non-subscriber data uploaded to the channel; and provide, in the channel GUI, a user-selectable option to update the subscription state used to modify the object of the channel GUI.

15. The system of claim 14, wherein the subscription state is determined based on login credentials of the user.

16. The system of claim 14, wherein the one or more content items from the channel are tailored to the user and to the channel based on a viewing history of the user in the computer network based content sharing platform.

17. The system of claim 14, wherein when the subscription state of the user is the non-subscriber of the channel and when the user has viewed a content item associated with the channel greater than a predetermined viewing threshold, providing the subscriber user interface on the object of the channel GUI.

18. The system of claim 14, wherein the portion of the channel GUI is located at a top section of the channel GUI.

\* \* \* \* \*